US012590181B2

(12) United States Patent
Brush et al.

(10) Patent No.: US 12,590,181 B2
(45) Date of Patent: Mar. 31, 2026

(54) HYDROPHOBICALLY-MODIFIED ASSOCIATIVE THICKENER POLYMERS PROCESS FOR THE PREPARATION AND USES THEREOF

(71) Applicant: HERCULES LLC, Wilmington, DE (US)

(72) Inventors: Kelly Anne Brush, Newark, DE (US); Venkataram Krishnan, Avondale, PA (US); Zeena Kottukapally Cherian, Exton, PA (US); Todd A. Brugel, Wilmington, DE (US)

(73) Assignee: HERCULES LLC, Wilmington, DE (US)

( * ) Notice: Subject to any disclaimer, the term of this patent is extended or adjusted under 35 U.S.C. 154(b) by 431 days.

(21) Appl. No.: 18/020,143

(22) PCT Filed: Aug. 6, 2021

(86) PCT No.: PCT/US2021/044982

§ 371 (c)(1),
(2) Date: Feb. 7, 2023

(87) PCT Pub. No.: WO2022/032122

PCT Pub. Date: Feb. 10, 2022

(65) Prior Publication Data

US 2023/0323138 A1 Oct. 12, 2023

Related U.S. Application Data

(60) Provisional application No. 63/062,883, filed on Aug. 7, 2020.

(51) Int. Cl.
*C08G 65/338* (2006.01)
*C08G 65/26* (2006.01)
(Continued)

(52) U.S. Cl.
CPC ....... *C08G 65/338* (2013.01); *C08G 65/2603* (2013.01); *C09D 5/00* (2013.01);
(Continued)

(58) Field of Classification Search
CPC .......... C09D 7/65; C09D 7/43; C08G 65/338; C09K 8/584
See application file for complete search history.

(56) References Cited

U.S. PATENT DOCUMENTS 4,405,514 A 9/1983 Zinkel et al.
5,574,127 A 11/1996 Sau
(Continued)

FOREIGN PATENT DOCUMENTS

CA 2792203 4/2013
CN 101094893 A 12/2007
(Continued)

OTHER PUBLICATIONS

Zarrintaj et al., "Polaxamer: A versatile tri-block copolymer for biomedical applications," 2020, Acta Biomaterialia 110, pp. 37-67. (Year: 2020).*
(Continued)

*Primary Examiner* — Robert A Vetere
(74) *Attorney, Agent, or Firm* — Aseem V. Metha; Nathalie Tietcheu

(57) ABSTRACT

Disclosed is a hydrophobically-modified associative thickener polymer prepared from a reaction mixture comprising a) a poloxamer tri-block copolymer of the formula (I):

(I)

(Continued)

b) at least one active hydrogen-containing compound c) a gem-polyhalide with an alkali hydroxide; or d) a polyglycidyl ether with an alkali hydroxide; e) optionally, a hydrophobe-containing compound; also disclosed are aqueous protective coating compositions; and further disclosed is a process to prepare a hydrophobically-modified associative thickener polymer.

36 Claims, 1 Drawing Sheet

(51) Int. Cl.
*C09D 5/00* (2006.01)
*C09D 7/43* (2018.01)
*C09D 7/61* (2018.01)
*C09D 7/65* (2018.01)
*C09D 171/02* (2006.01)

(52) U.S. Cl.
CPC ................. *C09D 7/43* (2018.01); *C09D 7/61* (2018.01); *C09D 7/65* (2018.01); *C09D 171/02* (2013.01); *C08G 2150/00* (2013.01); *C08G 2650/08* (2013.01); *C08G 2650/54* (2013.01)

(56) References Cited

U.S. PATENT DOCUMENTS 6,162,877 A 12/2000 Sau
6,673,273 B2 1/2004 Ba Le et al.
6,900,255 B2 * 5/2005 Sau .......................... C09D 7/44 524/48
7,985,795 B2 7/2011 Bobsein et al.
2008/0234411 A1 9/2008 Bobsein et al.
2010/0324177 A1 12/2010 Bakeev et al.
2011/0281980 A1 11/2011 Bobsein et al.
2019/0016859 A1 1/2019 Kornfield et al.

FOREIGN PATENT DOCUMENTS

| | | | |
|---|---|---|---|
| CN | 101298514 | A | 11/2008 |
| CN | 101448874 | A | 6/2009 |
| CN | 101676332 | A | 3/2010 |
| CN | 102439054 | A | 5/2012 |
| CN | 102471415 | A | 5/2012 |
| EP | 2166043 | B1 | 4/2016 |
| IL | 117755 | A1 | 1/2003 |

OTHER PUBLICATIONS

Karakasyan et al., “Synthesis and Rheological Properties of Responsive Thickeners Based on Polysaccharide Architectures,” 2008, Biomacromolecules, 9, pp. 2419-2429. (Year: 2008).*

References cited in the International Search Report of International Application No. PCT/US 21/44982.

Zarrintaj et al. “Poloxamer: A versatile tri-block copolymer for biomedical applications”, Acta Biomatetialla. May 2020. 110, pp. 37-67, especially: p. 41, Fig. 3, formula; p. 48, Fig. 11, formula F127.

E. Alami et al. Aggregation of Hydrophobically End-Capped Poly-(ethylene oxide) in Aqueous Solutions. Fluorescence and Light-Scattering Studies Department of Physical Chemistry, University of Uppsala, Macromolecules 1996, 29, 2229-2243.

* cited by examiner

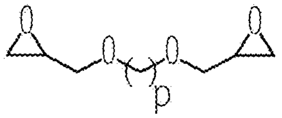
p = 1 to 6
q = 1 to 6
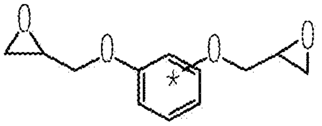
* ortho, meta, or para
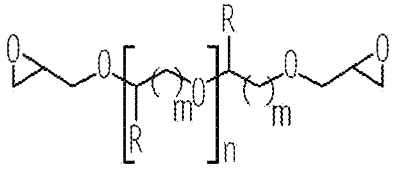
R = H or alkyl
m = 1 to 3
n = 0 to 500
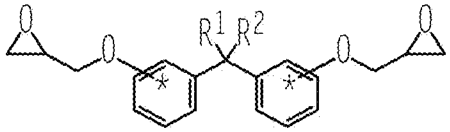
* ortho, meta, or para
$R^1$ and $R^2$ = H or alkyl
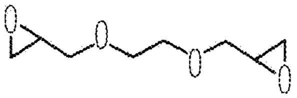
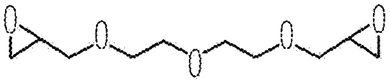
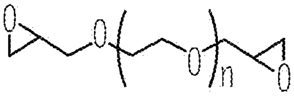
n = 1 to 25
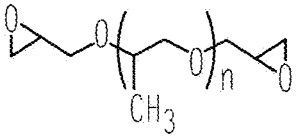
n = 1 to 25
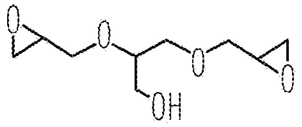
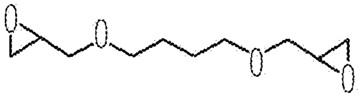
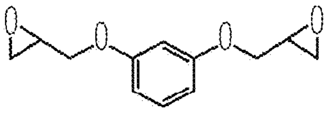
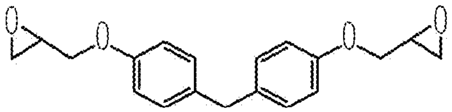
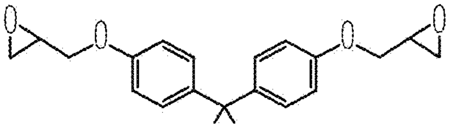

HYDROPHOBICALLY-MODIFIED ASSOCIATIVE THICKENER POLYMERS PROCESS FOR THE PREPARATION AND USES THEREOF

CROSS-REFERENCE TO RELATED APPLICATIONS

This application is a U.S. National Phase filing under 35 U.S.C. § 371 of International Application No. PCT/US2021/044982 filed Aug. 6, 2021, which claims benefit of priority U.S. Provisional Patent Application No. 63,062,883 filed Aug. 7, 2020. The entire disclosures of which are hereby incorporated in their entirety.

Field

The presently disclosed process(es), procedure(s), method (s), product(s), result(s), and/or concept(s) (collectively referred to hereinafter as the "present disclosure") relates generally to a method for preparing a reaction product and an aqueous protective coating composition comprising the reaction products thereof.

Background

Water-soluble polymers (also commonly referred to as "thickeners" or "rheology modifiers") are widely used in many industrial water-borne systems as additives to modify the systems' flow behavior. Thickeners increase and maintain viscosity at required levels under specified processing conditions and end-use situations. Thickeners are useful, for example, in decorative and protective coatings, paper coatings, cosmetics and personal care products, detergents, pharmaceuticals, adhesives and sealants, agricultural formulations, and petroleum drilling fluids.

Thickeners can be natural products, directly derived from natural products, or synthetically manufactured. Examples of natural thickeners may include, but are not limited to, casein, alginates, gum tragacanthins, guar, xanthan gum, locust and bean gum. Examples of naturally-derived thickeners may include, but are not limited to, cellulose ethers derived from cellulosics, such as hydroxyethyl cellulose (HEC), hydroxypropyl cellulose (HPC), and carboxymethyl cellulose (CMC). These natural and naturally-derived products (collectively, "natural products") vary in their thickening efficiency. One drawback of the natural products is that they are susceptible to microbial attack and hence, may require the addition of antimicrobial agents to the formulation. Examples of synthetic thickeners (also called "associative thickeners" or "associative polymers") may include, but are not limited to, various acrylic polymers, alkylene oxide polymers, amide polymers, and maleic anhydride polymers. Synthetic thickeners may also include non-ionic synthetic associative thickeners (NSAT) rheology modifiers, such as hydrophobically-modified ethoxylated urethane (HEUR), hydrophobically-modified polyethylene glycol (HmPEG) and hydrophobically-modified polyacetal-polyether (HmPAPE). These synthetic thickeners can be homopolymers or copolymers. Some of these polymers' hydrolytic stability depends on the pH of the solution and others are sensitive to various components normally found in aqueous coatings.

In recent years, synthetic associative thickeners have been used in a variety of applications including adhesives and personal care, and in industrial applications such as construction, specialty coatings, waterborne coatings, and latex paints. Synthetic associative thickeners serve several roles in aqueous systems. For instance, in latex paints and water-borne coatings, the thickener can provide improved stability and pigment/extender suspension, as well as improved rheological and application properties. Additionally, synthetic associative thickeners can be prepared with certain properties in mind because they are synthesized from basic chemicals. In other words, synthetic associative thickeners can be tailored for desired and/or targeted properties from the ground up.

It has been found that novel polymers and compositions according to the present disclosure can provide, among many other performance attributes, the important benefits of improved rheological properties. The polymers and compositions thereof may advantageously be used in various industrial applications including coatings.

BRIEF DESCRIPTION OF THE DRAWINGS

FIG. 1 depicts various polyglycidyl ether components of the embodiments of hydrophobically-modified associative thickener polymers.

DETAILED DESCRIPTION

Before explaining at least one embodiment of the present disclosure in detail, it is to be understood that the present disclosure is not limited in its application to the details of construction and the arrangement of the components or steps or methodologies set forth in the following description or illustrated in the drawings. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one" but it is also consistent with the meaning of "one or more," "at least one." and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone. Y alone, and Z alone, as well as any combination of X, Y, and Z. The use of ordinal number terminology (i.e., "first", "second", "third", "fourth", etc.) is solely for the purpose of differentiating between two or more items and, unless otherwise stated, is not meant to imply any sequence or order or importance to one item over another or any order of addition.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

For purposes of the following detailed description, other than in any operating examples, or where otherwise indicated, numbers that express, for example, quantities of ingredients used in the specification and claims are to be understood as being modified in all instances by the term "about". The numerical parameters set forth in the specification and attached claims are approximations that may vary depending upon the desired properties to be obtained in carrying out the invention.

The term "alkyl" refers to a saturated linear or branched hydrocarbon group of 1 to 50 carbons.

The term "alkylene" as used herein refers to an unsaturated, linear or branched hydrocarbon group of 1 to 50 carbon atoms with one or more carbon-carbon double bonds.

The term "alkylene" as used herein refers to an unsaturated, linear or branched hydrocarbon group of 1 to 50 carbon atoms with one or more carbon-carbon triple bonds.

The term "aryl" refers to a mono- or polynuclear aromatic hydrocarbon group including carbocyclic and heterocyclic aromatic groups.

The term "monomer" refers to a molecule, typically having a molecular weight of less than or equal to about 1,000 Daltons, that chemically bonds during polymerization to one or more monomers of the same or different kind to form a polymer.

The term "polymer" refers to a macromolecular compound, typically having a molecular weight of from about 1,000 to about 500,000 Daltons, comprising one or more types of monomer residues (repeating units) connected by covalent chemical bonds. By this definition, polymer encompasses compounds wherein the number of monomer units may range from very few, which more commonly may be called as oligomers, to very many. Non-limiting examples of polymers include homopolymers, and non-homopolymers such as copolymers, terpolymers, tetrapolymers and the higher analogues.

The term "pigment" refers to an organic or inorganic material that is used to provide hiding or color to a paint formulation. The term "extender" refers to an inorganic material that is used as a filler in a paint formulation.

All percentages, ratio, and proportions used herein are based on a weight basis unless other specified.

The present disclosure is directed to a hydrophobically-modified associative thickener polymer prepared from a reaction mixture comprising:

a) Poloxamer tri-block copolymer of the formula (I):

(I)

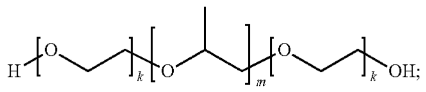

b) at least one active hydrogen-containing compound;
c) a gem-polyhalide with an alkali hydroxide; or
d) a polyglycidyl ether with an alkali hydroxide;
e) optionally, a hydrophobic containing compound
where k is an integer in a range of 5 to 200 and m is an integer in a range of 5 to 150

In some embodiments, the method for preparing the hydrophobically-modified associative thickener polymer comprises: (1) molten mixing at least one active hydrogen-containing component, a poloxamer component, and an alkali hydroxide to form a first mixture; (2) adding water into the first mixture to dissolve the first molten alkali hydroxide to form a second mixture; (3) reacting the second mixture with a gem-polyhalide compound or a sulfonate ester for a sufficient time to form the reaction product. In one non-limiting embodiment, the reaction product can be poly (acetal- or ketal-polyether).

In a non-limiting embodiment, the method for preparing the hydrophobically-modified associative thickener polymer further includes a step (4) reacting a hydrophobic component with the reaction product. In some non-limiting embodiments, step (4) may be repeated any number of times, such as 1 time, or 2 times, or 3 times, or 4 times, or 5 times, or more, wherein the hydrophobic component may be varied between subsequent steps.

The active hydrogen-containing components can be identical or different. If two or more active hydrogen-containing components are used, one must be at least difunctional. The active hydrogen-containing components can be monofunctional, comprising a single functional group of OH, SH, or $NH_2$. The active hydrogen-containing components can be comprising at least two functional groups of OH, SH, or $NH_2$. The term "at least difunctional" may include difunctional, trifunctional, and tetrafunctional active hydrogen-containing components. The active hydrogen-containing compound can be represented by formula (H):

$$D\text{-}X_n \qquad \text{(II)}$$

where X is OH, SH, or $NH_2$; D is substituted or unsubstituted compounds having a functionality selected from the group consisting of alkyl, alkylene, alkyne, alkenyl, alkynyl, aryl alkylaryl, arylalkylene, arylalkyne, arylalkenyl, arylalkynyl, cyclic, cycloaliphatic, or polycyclic moieties, optionally containing at least one heteroatom, and n is an integer in a range from 1 to 4 where when n is 1 the active hydrogen containing compound is 'monofunctional', and when n is 2 the active hydrogen containing compound is 'difunctional' and when n is 3 the active hydrogen containing compound is 'trifunctional', and when n is 4 the active hydrogen containing compound is 'tetrafunctional'. For instance, by way of example only, the monofunctional active hydrogen-containing component may be an alkoxylated or non-alkoxylated alcohol, which can each be represented by the formula (III):

(III)

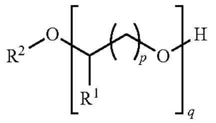

where $R^1$ is H or alkyl (such as $CH_3$); p is an integer in a range of from 1 to 3; q is an integer in a range of from 0 to 500; $R^2$ is a linear, branched, substituted, unsubstituted compound having a functionality selected from the group consisting of alkyl, alkylene, alkenyl, alkylene, alkynyl, aryl, arylalkylene, arylalkenyl, arylalkynyl, cyclic, and cycloaliphatic compounds wherein the total number of carbon atoms is in a range from 1 to 30.

Substitution, branching, saturation, unsaturation, or cyclization can occur anywhere between carbon 1 and carbon 30 of $R^2$. One or more branched side-chain(s) containing a range of from 1 to 30 carbons can be found anywhere from carbon 1 to carbon 30 in R. The one or more branched side-chain(s) can also be substituted or unsubstituted alkyl, alkylene, alkenyl, alkylene, alkynyl, aryl, arylalkylene, arylalkenyl, arylalkynyl, cyclic, or cycloaliphatic.

Examples of monofunctional active hydrogen-containing components can include, but are not limited to, the following alcohols and alkoxylated versions of the alcohols: methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-docosanol, 1-tricosonal, 1-tetracosanol, 1-hexacosanol, 1-heptacosanol, 1-octacosanol, 1-nonacosanol, 1-triacontanol, 3-methyl-3-buteno-1-ol, 3-buteno-1-ol, 2-butanol, 3-methyl-1-butanol, 2-ethyl-1-pentanol, 2,4-dimethyl-1-pentanol, 2,3-dimethyl-1-pentanol, 2-propyl-1-pentanol, 3-ethyl-2-methyl-1-pentanol, 2,3,4-trimethyl-1-pentanol, 2-(1-methylethyl)-1-pentanol, 4-methyl-2-propyl-1-pentanol, 3-methyl-2-propyl-1-pentanol, 2,3-diethyl-1-pentanol, 3-ethyl-2,4-dimethyl-1-pentanol, 2,4,4-trimethyl-1-pentanol, 3-pentanol, 2-pentanol, 2-methyl-3-pentanol, 3-methyl-2-pentanol, 4-penten-2-ol, 3-ethyl-2-pentanol, 3,4-dimethyl-2-pentanol, 4-methyl-3-(1-methylethyl)-2-pentanol, 4-methyl-4-penten-2-ol, 3-methyl-4-penten-2-ol, 3-methyl-2-pentyn-2-ol, 5-hexen-1-yn-ol, 1,5-hexane-3-ol, 1-hepten-4-ol, 2-methyl-1-hexanol, 2-ethyl-hexen-1-ol, 2-methyl-1-heptanol, 3-methyl-2-hexanol, 2-ethyl-1-heptanol 4-methyl-3-heptanol, 3-methanol-2-heptanol, 2,4-dimethyl-1-hexanol, 2,5-dimethyl-1-hexanol, 2-ethyl-1-hexanol, 3-ethyl-2-hexanol, 2-butyl-1-hexanol, 2-ethyl-4-methyl-1-hexanol, 3-propyl-2-hexanol, 2-(1-methylethyl)-1-hexanol, 2-ethyl-3-methyl-1-hexanol, 2-ethyl-5-methyl-1-hexanol, 3-ethyl-2-methyl-1-hexanol, 4-ethyl-2-methyl-1-hexanol, 4-methyl-2-propyl-1-hexanol, 5-methyl-2-propyl-1-hexanol, 4-methyl-2-hexanol, 4-methyl-3-hexanol, 2-methyl-3-hexanol, 5-methyl-3-hexanol, 3-hexanol, 5-hexen-3-ol, 5-methyl-2-hexanol, 2,6-dimethyl-1-heptanol, 2-propyl-1-heptanol, 3-ethyl-2-heptanol, 2,5-dimethyl-1-heptanol, 2,4-dimethyl-1-heptanol, 2,3-dimethyl-1-heptanol, 4-ethyl-3-heptanol, 2-butyl-1-octanol, 2-methyl-1-octanol, 2-ethyl-1-octanol, 5-methyl-4-octanol, 3-methyl-2-octanol, 4-methyl-3-octanol, 4-octanol, 3-octanol, 2,7-dimethyl-1-octanol, 5-ethyl-4-octanol, 6-ethyl-4-octanol, 2-methyl-1-nonanol, 2-methyl-5-nonanol, 4-methyl-5-nonanol, 7-methyl-4-nonanol, 7-methyl-5-nonanol, 3-nonanol, 2-nonanol, 2-methyl-1-decanol, 2-decanol, 5-decanol, 6-ethyl-4-decanol, 2-ethyl-1-dodecanol, 2-propyl-1-undecanol, 2-butyl-1-undecanol, 2-(1-methylethyl)-1-undecanol, 2-(2-methylpropyl)-1-undecanol, 2-heptyl-1-undecanol, 2-(1,1-dimethylethyl)-1-undecanol, 2-(2-propen-1-yl)-1-undecanol, 8-methyl-4-undecanol, 3-ethyl-2-dodecanol, 2-propyl-1-dodecanol, 2-ethyl-1-dodecanol, 2-butyl-1-dodecanol, 2-(1-methylethyl)-1-dodecanol, 2-(2-methylpropyl-1-dodecanol, 2-hexyl-1-dodecanol, 2-(1-methylethyl-2-dodecanol, 4-dodecanol, 5-dodecanol, 6-dodecanol, 2-octyl-1-dodecanol, 2-(1,1-dimethylethyl)-1-dodecanol, 3-(1-methylethyl)-2-tridecanol, 2-nonyl-1-tridecanol, 4-tridecanol, 5-tridecanol, 6-tridecanol, 7-tridecanol, 2-ethyl-1-tetradecanol, 2-propyl-1-tetradecanol, 2-(1-methylethyl)-1-tetradecanol, 2-octyl-1-tetradecanol, 2-(2-methylpropyl)-1-tetradecanol, 2-dodecyl-1-tetradecanol, 2-(1,1-dimethylethyl)-1-tetradecanol, 2-decyl-1-tetradecanol, 3-(1-methylethyl)-2-pentadecanol, 3-ethyl-2-pentanedecanol, poly(ethylene glycol) methyl ether, ethylene oxide/propylene oxide-copolymer-monobutyl ether, polyalkylene glycol monovinyl ether, polyethylene glycol monoallyl ether, tristyrylphenol-polyglycolether, 2,3-di-1-naphthalenylphenyl, 2,6-bis(1-phenylethyl)-phenol, 2,4,6-tris(l-phenylethyl)-phenol, 2-(1-methyl-1-phenylethyl)-phenol, 2-(2-phenylethyl)-phenol, 2,6-bis(1-methyl-1-phenylethyl)-phenol, 2,4-bis(phenylmethyl)-phenol, 3-(phenylmethyl-phenol, (1,1'-biphenyl)-2-ol, 2,4,6-tris(phenylmethyl)-phenol, 2-(phenylmethyl)-phenol, 5'-phenyl-(1,1':3',1"-terphenyl)-2'-ol, 2,4-bis(1-phenylethyl-phenol, (1,1':3',1"-terphenyl)-4'-ol, 2,4,6-tris(1-methyl-1-phenylethyl)-phenol, 2-(1-phenylethyl)-phenol, 2,4-bis(1-methyl-1-phenylethyl)-phenol, 2,6-bis(phenylmethyl)-phenol, 4-(phenylmethyl)-phenol, 4-(1-phenylethyl)-phenol, and 3-(1-methyl-1-phenylethyl)-phenol.

By way of example only, the at least difunctional active hydrogen-containing components may each be represented by formula (V):

(V)

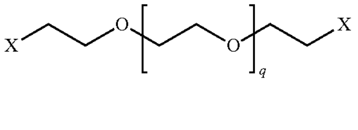

where X is OH, SH, or $NH_2$, and q is an integer in a range of from 0 to 500. For example, but not by way of limitation, the at least difunctional active hydrogen-containing components can comprise a dihydric alcohol, a polyol, or a polyetheramine.

The dihydric alcohol may be polyethylene glycol. Examples of polyethylene glycol can include, but are not limited to, commercial products such as Polyethylene Glycol 200, Polyethylene Glycol 300, Polyethylene Glycol 400, Polyethylene Glycol 600, Polyethylene Glycol 1000. Polyethylene Glycol 1500, Polyethylene Glycol 3350, Polyethylene Glycol 4000, Polyethylene Glycol 6000, Polyethylene Glycol 8000; and Polyglykol 400, Polyglykol 60, Polyglykol 40005, Polyglykol 8000S, Polyglykol 9000S, Polyglykol 20000S, Polyglykol 35000S that are commercially available from Clariant.

Other dihydric alcohols can include, but are not limited to, aminoethylpolyethylene glycol such as 0-(2-aminoethyl) polyethylene glycol 3000, and O-(2-aminoethyl)polyethylene glycol 5000.

The polyetheramine can be dihydric polyetheramines containing primary amino groups attached to the end of a polyether backbone such as, but not limited to, Jeffamine® polyetheramines.

The polyol is a compound having three or more hydroxyl groups. Examples of the polyols used in the present disclosure can include, but are not limited to, Voranol™ Triol Polyether Polyols (commercially available from DowDuPont Inc.); glycerin initiated, ethylene oxide trifunctional polyols including JEFFOL® G31-28 Polyol, JEFFOL® G31-35 Polyol and JEFFOL® G31-43 Polyol (commercially available from Huntsman Corporation); and pentaerythritol initiated, ethylene oxide tetrafunctional polyols.

The hydrophobic components can be monofunctional. For instance, by way of example only, the hydrophobic components can each independently be alkyl halides, sulfonate esters, or monoepoxides. In one non-limiting embodiment, the hydrophobic components can be a monofunctional hydrophobic compound with an epoxide functionality represented by formula (VI):

(VI)

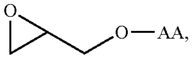

wherein AA is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, cycloaliphatic, and polycyclic moieties, optionally containing at least one heteroatom. Examples of monoepoxides can include, but are not limited to, allylglycidyl ether (AGE), 2-ethylhexylglycidyl ether (EHGE), hexadecylglycidyl ether (HAGE-13, commercially available from Sachem), oxirane [(docosyloxy), methyl] (HAGE-22, commercially available from Sachem), naphthylglycidyl ether (NGE), n-butylglycidyl ether (n-BGE), iso-butylglycidyl ether (iso-BGE), and Cardura™ E10P glycidyl ether, Cardolite® Ultra LITE 513 (glycidyl ether based on cashew nutshell liquid technology), and glycidyl ester of Versatic™ acid 10 (Hexion).

In another non-limiting embodiment, the hydrophobic components can be comprising a single functional group of Br, Cl, 1, or F represented by formula (VII):

Z-G (VII)

where Z is Br, Cl, I, or F; and G is a substituted or unsubstituted compound having a functionality selected from the group consisting of alkyl, alkylene, alkyne, alkenyl, alkynyl, aryl, alkylaryl, arylalkylene, aryl alkyne, arylalkenyl, arylalkynyl, cyclic, cycloaliphatic, or polycyclic moieties, optionally containing at least one heteroatom. Examples of alkyl halides can include, but are not limited to, 1-bromobutane, 1-bromopentane, 1-bromohexane, 1-bromoheptane, 1-bromooctane, 1-bromononane, 1-bromodecane, 1-bromoundecane, 1-bromododecane, 1-bromotridecane, 1-bromotetradecane, 1-bromopentadecane, 1-bromohexadecane, 1-bromoheptadecane, 1-bromooctadecane, 1-bromononadecane, 1-bromoeicosane, 1-bromoeicosane, and 1-bromodocosane.

In yet another non-limiting embodiment, the monofunctional hydrophobic components can each independently be a sulfonate ester.

In certain non-limiting embodiments, the hydrophobic components may include an active hydrogen-containing component. For instance, by way of example only, the hydrophobic components may independently comprise an active hydrogen-containing component that can be substituted or unsubstituted, and/or pure or mixed cut alkyl, alkylene, alkyne, alkenyl, alkynyl, aryl, alkylaryl, arylalkylene, aryl alkyne, arylalkenyl, arylalkynyl, cyclic, cycloaliphatic, or polycyclic moieties, optionally containing at least one heteroatom. Non-limiting examples of such hydrophobic components containing an active hydrogen-containing component can include those hydrophobic components as described above, and may include tristyrylphenol-polyglycolether commercially available as Emulsogen TS100 from Clariant; C12 ethoxylate commercially available as Novel 12-10 ethoxylate from Sasol; C16 ethoxylate commercially available as Novel 16-10 ethoxylate from Sasol; C16 ethoxylate commercially available as Alkonat C200 from Oxiteno; C16/C18 ethoxylate commercially available as Genapol 0100 from Clariant; C18 ethoxylate commercially available as Genapol HS200 from Clariant or as Novel 18-20 ethoxylate from Sasol; C22 ethoxylate commercially available as Novel 22-25 ethoxylate from Sasol, and Cardolite® GX-5170 (ethoxylate surfactant based on cashew nutshell liquid technology).

When the hydrophobic component(s) contains an active hydrogen-containing component, examples of the hydrophobic component(s) can also include, but are not limited to, polyethylene glycol monomethacrylates, alcohols, amines, and thiols. An example of polyethylene glycol monomethacrylate can include Genangen M 5000 MA which is commercially available from Clariant. Examples of amines can include, but are not limited to, butylamine, pentylamine, hexylamine, heptylamine, octylamine, nonylamine, decylamine, dodecylamine, tridecylamine, tetradecylamine, pentadecylamine, hexadecylamine, heptadecylamine, octadecylamine, and nonadecylamine. Examples of thiols can include, but are not limited to, 1-octanethiol, 1-decanethiol, 1-dodecanethiol, 1-hexadecanethiol, and 1-octadecanethiol.

The gem-polyhalide can be at least difunctional, comprising at least two functional groups of Br, Cl, I, or F. The term "at least difunctional" may include difunctional, trifunctional, and tetrafunctional hydrophobic components. Examples of gem-polyhalides can include, but are not limited to, dibromomethane, pentaerythrityl tetrabromide, and 1,3,5-tris(bromomethyl)benzene.

In one non-limiting embodiment, the gem-polyhalide compound is selected from the group consisting of dibromomethane, dichloromethane, 1,1-dichlorotoluene, 1,1-dichloroethane and 1,1-dibromoethane, pentaerythrityl tetrabromide, 1,3-dibromo-2-(bromomethyl)-2-methylpropane, 1,3-dichloro-2-(chloromethyl)-2-methylpropane, 2,2-dimethyl-1,3-dichloropropane, 1,3-dibromo-2,2-dimethylpropane, 1,3-dibromo-2-(bromomethyl)-propane, 1,3,5-tris(chloromethyl)benzene, p-xylylene dibromide, pentaerythritol tetrachloride, pentaerythritol tetrabromide, 1,3,5-tris(bromomethyl)benzene, 1-(bromomethyl)-4-(chloromethyl)-benzene, 1,3-dichloro-2-(chloromethyl)propane.

In another non-limiting embodiment, the gem-polyhalide can be replaced with a sulfonate ester derived from di or polyalcohols.

In some embodiments, the method for preparing the hydrophobically-modified associative thickener polymer comprises: (1) molten mixing at least one active hydrogen-containing component, a poloxamer component, and an alkali hydroxide to form a first mixture; (2) adding water into the first mixture to dissolve the first molten alkali hydroxide to form a second mixture; (3) reacting the second mixture with a polyglycidyl ether compound for a sufficient time to form the reaction product.

In a non-limiting embodiment, the method further includes a step (4) reacting a hydrophobic component with the reaction product. In some non-limiting embodiments, step (4) may be repeated any number of times, such as 1 time, or 2 times, or 3 times, or 4 times, or 5 times, or more, wherein the hydrophobic component may be varied between subsequent steps.

The active hydrogen-containing components and the hydrophobic components have been described previously.

The polyglycidyl ether is selected from the group consisting of a difunctional, trifunctional, and tetrafunctional polyglycidyl ether of the formula (VII):

(VIII)

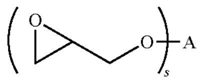

Where A is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, cycloaliphatic, or polycyclic moieties, optionally containing at least one heteroatom; and s is an integer in the range of from 2 to 4 where when s is 2 the polyglycidyl ether is 'difunctional', and when s is 3 the polyglycidyl ether is 'trifunctional', and when s is 4 the polyglycidyl ether is 'tetrafunctional'.

A non-limiting example of a polyglycidyl ether is represented by formula (IX):

(IX)

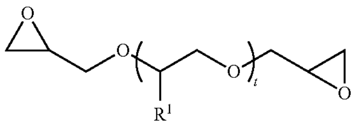

Where $R^1$ is H or methyl, and t is an integer in the range from 1 to 500.

Non-limiting examples of the polyglycidyl ether components can include, but are not limited to, examples in FIG. 1.

The present disclosure also relates to an aqueous protective coating composition comprising the hydrophobically-modified associative thickener polymer described previously. The aqueous protective coating composition can further comprise a substantially water insoluble polymer such as a latex polymer or other types of polymer dispersions. The latex polymers can be made by polymerization of various ethylenically unsaturated monomers, such as ethylene, vinyl, and acrylic monomers. Oftentimes, the latex polymers are made by copolymerizing more than one monomer to achieve several desired properties, particularly for applications in latex paints with very little or no volatile organic compounds (VOCs).

Examples of the latex polymers used in the aqueous protective coating composition can include, but are not limited to, homo- or co-polymers of vinyl acetate, methacrylic acid, acrylic acid, methylacrylate, methylmethacrylate, ethylacrylate, butyl acrylate, 2-ethylhexyl acrylate, styrene, ethylene, vinyl chloride, vinyl ester of versatic acid (VeoVa), vinyl propionate, butadiene, acrylonitrile, maleates, and fumarates. In one non-limiting embodiment, the latex polymer is selected from the group consisting of acrylics, vinyl-acrylics, styrene-acrylics, and vinyl acetate ethylene (VAE).

Other types of polymer dispersions include but are not limited to those made typically by condensation or addition polymerization, usually in bulk or in the presence of a solvent. The polymers are then dispersed in water and the solvent substantially removed. The dispersion in water is typically aided by nonionic or anionic functionality on the polymer backbone and/or through the addition of surfactants. Examples of such polymers are epoxies, polyesters, polyamides, polyurethanes, phenolics, melamine-urea formaldehyde resins, silicones, acrylics etc.

Other types of polymers that can be added can include, but are not limited to, cellulosics (cellulose nitrate and cellulose esters), coumarone-indenes, hydrocarbon resins, natural resins, oleo resins, rosins, terpenes, and the like.

The aqueous protective coating composition can further comprise a pigment/extender, a coalescent, a solvent, a wetting agent, a defoamer, a matting agent, a dispersant, a thickener, a biocide, a mildewcide, and a surfactant. The aqueous protective coating composition may optionally contain other components such as those generally used in coatings. Typical components include, but are not limited to, fillers, flattening agents, plasticizers, stabilizers, viscosifiers, suspension agents, flow control agents, anti-skinning agents, extenders, film formation aids, crosslinkers, surface improvers, corrosion inhibitors, anti-staining agents, leveling aids, humectants/wet edge agents (e.g., ethylene glycol, propylene glycol, and hexylene glycol), pH modifiers, and their combinations thereof.

Pigments/extenders are used to provide hiding, color and as fillers. Specific examples of the pigments/extenders can include, but are not limited to, carbazole dioxazine crude pigment; monoazo pigments (acetoacetarylide, benzimidazolone, naphthol AS, pigmented b-naphthol dyes), disazo pigments (azo condensation pigments, dipyrazolone), polycyclic pigments (quinacridone, dioxazine, perylene, diketopyrrolopyrrole, isoindoline), and metal complex pigments (cuphthalocyanines); isoindolinone; isoindoline; polycyclic phthalocyanine; quinacridone; perylene; perinone; diketo-pyrrolo pyrrole; thioindigo; anthraquinone; indanthrone; anthrapyrimidine; flavanthrone; pyranthrone; anthanthrone; dioxazine; triarylcarbonium; quinophthalone pigments; diketo pyrrolo pyrrole red ("DPPBO red"); titanium dioxide; carbon black; barium sulfate; calcium silicate; zinc oxide; magnesium aluminum silicate; precipitated calcium carbonate; ground calcium carbonate; kaolin; talc; clay; barium sulfate; glass beads; calcium sulfate; barium sulfate; zinc sulfide; zinc carbonate; satin white; aluminum silicate; diatomaceous earth: magnesium silicate; synthetic amorphous silica; colloidal silica; colloidal alumina; fumed alumina; fumed silica; pseudo-boehmite; aluminum hydroxide, alumina; modified alumina; mica; lithopone; zeolite; hydrated halloysite; magnesium carbonate; magnesium hydroxide; lampblack; black iron oxide; nepeline syenite; red iron oxide; yellow iron oxide; brown iron oxide (a blend of red and yellow oxide with black); phthalocyanine green; phthalocyanine blue; organic reds (such as naphthol red, quinacridone red and toulidine red); quinacridone magenta, quinacridone violet; DNA orange; and/or organic yellows (such as Hansa yellow). Oftentimes, titanium dioxide grades used in the aqueous protective coating composition are surface modified with various inorganic oxides, such as silicates, aluminates, and zirconates.

The amount of the hydrophobically-modified associative thickener polymer used in the aqueous protective coating composition of the present disclosure is the amount effective in providing the desired thickening and rheological properties to the coating composition. In one non-limiting embodiment, the reaction product can be used in a range of from about 0.05 to about 10 wt %, 0.05 to about 5 wt %, or from about 0.05 to about 4 wt %, or from about 0.05 to about 3 wt %, or from about 0.2 to about 4 wt %, or from about 0.2 to about 3 wt %, or from about 1 to about 4 wt %, or from about 1 wt to about 3 wt %, or from about 1 to about 2 wt % of the total aqueous protective composition.

The following examples illustrate the present disclosure, parts and percentages being by weight, unless otherwise indicated. Each example is provided by way of explanation of the present disclosure, not limitation of the present disclosure. In fact, it will be apparent to those skilled in the art that various modifications and variations can be made in the present disclosure without departing from the scope or spirit of the invention. For instance, features illustrated or described as part of one embodiment, can be used on another embodiment to yield a still further embodiment. Thus, it is intended that the present disclosure covers such modifications and variations as come within the scope of the appended claims and their equivalents.

EXAMPLES

The synthesis of polymers A-M are described in Examples 1-4.

In the Examples, the following abbreviations are used:

$M_n$: number-average molecular weight $M_w$: weight-average molecular weight $M_z$: Z-average molecular weight NaOH: Sodium hydroxide C12Br: 1-Bromododecane C16Br: 1-Bromohexadecane C18 EO: C18 Ethoxylate ~20 mole EO DGE PEG1: Poly(ethylene glycol) diglycidyl ether with approximate $M_n$=500 (available from Sigma Aldrich)

BHT: Butylated hydroxytoluene

PEO: Poly(ethylene oxide)

PPO: Poly(propylene) oxide

Poloxamer: PEO and PPO block copolymers. Examples include: Pluronic® F127 Prill. Pluronic® F108 NF Prill, Pluronic® F88 Prill, Pluronic® PE 10500

Poloxamer1A: Pluronic® F88 Prill with approximate $M_n$=9,360; $M_w$=10,600

Poloxamer1B: Pluronic® F88 with approximate $M_n$=9,550; $M_w$=10,800

Poloxamer2: Pluronic® F127 Prill with approximate $M_n$=9,110; $M_w$=10,700

Poloxamer3: Pluronic® F108 NF Prill with approximate $M_n$=11,400; $M_w$=13,600

Poloxamer4: Pluronic® PE 10500 with approximate $M_n$=4,250; $M_w$=5.350

PEG1: Polyethylene glycol with approximate $M_n$=8,500; $M_w$=8,860

PEG2: Polyethylene glycol with approximate $M_n$=8,010; $M_w$=8,330

PEG3: Polyethylene glycol with approximate $M_n$=7,620; $M_w$=8,140

PEG4: Polyethylene glycol with approximate $M_n$=8,410; $M_w$=8.880

Example 1: Synthesis of Polymers A-C

A reactor was charged with PEG (optionally), poloxamer, and NaOH. The contents of the reactor were mixed for TIME1 under vacuum of 29 in. Hg while the temperature was increased to TEMP1. The vacuum was turned off and water was added. The contents of the reactor were mixed for TIME2 at TEMP1. DBM was added in one portion at TEMP1 and the contents of the reactor were mixed for TIME3. At the end of TIME3, the temperature had increased to TEMP2. The contents of the reactor were discharged and allowed to cool to 20-25° C. to give solid Polymers A, B, and C. Table 1 lists the quantities of reagents and Table 2 lists the reaction conditions required for making Polymers A, B, and C.

TABLE 1

| Polymer | PEG Type | PEG (g) | Poloxamer Type | Poloxamer (g) | Water (g) | NaOH (g) | DBM (g) |
|---|---|---|---|---|---|---|---|
| A | — | 0.00 | Poloxamer1 | 1340.70 | 1.94 | 37.55 | 16.00 |
| B | PEG2 | 670.50 | Poloxamer1 | 670.50 | 1.94 | 37.55 | 16.00 |
| C | PEG2 | 898.47 | Poloxamer1 | 442.53 | 1.94 | 37.55 | 16.00 |

TABLE 2

| Polymer | TIME1 (min) | TIME2 (min) | TIME3 (min) | TEMP1 (° C.) | TEMP2 (° C.) |
|---|---|---|---|---|---|
| A | 65 | 15 | 120 | 90 | 100-106 |
| B | 60 | 20 | 65 | 89 | 91-96 |
| C | 70 | 20 | 65 | 89 | 93-98 |

Example 2: Synthesis of Polymers D-I

A reactor was charged with PEG, poloxamer, and NaOH. The contents of the reactor were mixed for TIME1 under vacuum of 29 in. Hg while the temperature was increased to TEMP1. The vacuum was turned off and water was added. The contents of the reactor were mixed for TIME2 at TEMP1. DBM was added in one portion at TEMP1 and the contents of the reactor were mixed for TIME3. At the end of TIME3, the temperature had increased to TEMP2. Alkyl halide was added in one portion as the temperature was increased to TEMP3. Once at TEMP3, the contents of the reactor were mixed for TIME4. The contents of the reactor were mixed for TIME5 at TEMP3 under vacuum of 29 in. Hg for Polymers D, E, F, G, and H. No vacuum was applied for making the Polymer I. The contents of the reactor were discharged and allowed to cool to 20-25° C. to give solid Polymers D, E, F, G, H, and I. Table 3 lists the quantities of reagents and Table 4 lists the reaction conditions required for making Polymers D, E, F, G, H, and I.

Example 3: Synthesis of Polymers J and K

A reactor was charged with PEG, poloxamer, and NaOH. The contents of the reactor were mixed for TIME1 under vacuum of 29 in. Hg while the temperature was increased to TEMP1. The vacuum was turned off and water and C18 ethoxylate were added. The contents of the reactor were subjected to 3-5 cycles of vacuum (~5-29 in. Hg) followed by nitrogen pressurization (to ~5-10 lbs.) to inert the contents of the reactor. After the last pressurization, the contents of the reactor were placed under static vacuum (~5-10 in. Hg) for ease of transfer of DBM in the next step. The contents of the reactor were mixed for TIME2 at TEMP1. DBM was added over TIME3 at TEMP1. At the end of the DBM addition, the contents of the reactor were heated to TEMP2. From the beginning of the DBM addition, the contents of the reactor were mixed for TIME4. At TIME4, the contents of the reactor were heated to TEMP3. From the beginning of the DBM addition, the contents of the reactor were mixed for TIME5. At the end of TIME5, the contents of the reactor were mixed for TIME6 at TEMP3 under vacuum of 29 in. Hg. The contents of the reactor were discharged and allowed to cool to 20-25° C. to give solid Polymers J and K. Table 3 lists the quantities of reagents and Table 4 lists the reaction conditions required for making Polymers J and K.

TABLE 3

| Polymer | PEG Type | PEG (g) | Poloxamer Type | Poloxamer (g) | Water (g) | NaOH (g) | DBM (g) | C12Br (g) | C16 Br (g) | C18 EO (g) |
|---|---|---|---|---|---|---|---|---|---|---|
| D | PEG1 | 1275.0 | Poloxamer2 | 75.00 | 1.95 | 37.80 | 18.52 | 81.57 | — | — |
| E | PEG1 | 1125.0 | Poloxamer2 | 225:00 | 1.95 | 37.80 | 18.52 | 81.57 | — | — |
| F | PEG1 | 1275.0 | Poloxamer1 | 75.00 | 1.95 | 37.80 | 18.52 | 81.57 | — | — |
| G | PEG1 | 1275.0 | Poloxamer4 | 75.00 | 1.95 | 37.80 | 19.82 | 81.57 | — | — |
| H | PEG1 | 1275.0 | Poloxamer3 | 75.00 | 1.95 | 37.80 | 18.52 | 81.57 | — | — |
| I | PEG2 | 1200.0 | Poloxamer1 | 150.00 | 2.07 | 40.16 | 19.80 | — | 99.80 | — |
| J | PEG3 | 1287.0 | Poloxamer2 | 63.00 | 2.11 | 63.40 | 62.50 | — | — | 169.0 |
| K | PEG1 | 1200.0 | Poloxamer2 | 150.00 | 2.00 | 60.30 | 59.40 | — | — | 170.0 |

TABLE 4

| Polymer | TIME1 | TIME2 | TIME3 | TIME4 | TIME5 | TIME6 | TEMP1 | TEMP2 | TEMP3 |
|---|---|---|---|---|---|---|---|---|---|
| D | 50 | 20 | 65 | 150 | 30 | — | 90-91 | 98 | 128-130 |
| E | 50 | 20 | 60 | 150 | 30 | — | 91-92 | 97 | 128-131 |
| F | 45 | 25 | 70 | 170 | 30 | — | 90 | 95 | 126-130 |
| G | 40 | 15 | 60 | 165 | 40 | — | 90 | 97 | 128-130 |
| H | 40 | 20 | 60 | 150 | 30 | — | 90 | 99 | 129-131 |
| I | 60 | 20 | 60 | 130 | — | — | 91 | 103 | 130-131 |
| J | 30 | 20 | 27 | 53 | 107 | 30 | 82-92 | 120-123 | 130-132 |
| K | 55 | 40 | 30 | 55 | 130 | 30 | 89-90 | 120-122 | 130-132 |

Example 4: Synthesis of Polymers L and M

A reactor was charged with PEG, poloxamer, and NaOH. The contents of the reactor were mixed for TIME1 under vacuum of 29 in. Hg while the temperature was increased to TEMP1. At TEMP1, the contents of the reactor were maintained under vacuum of 29 in. Hg for TIME2. The vacuum was turned off and BHT was added. The contents of the reactor were subjected to nitrogen pressurization (to ~5-10 lbs) followed by vacuum (no more than 20 in. Hg) to inert the contents of the reactor. Water was added and the contents of the reactor were mixed for TIME3. DGE PEG1 was added over TIME4. At the end of TIME4, the temperature was increased to TEMP2. Once at TEMP2, alkyl halide was added and the contents of the reactor were mixed for TIME5. The contents of the reactor were discharged and allowed to cool to 20-25° C. to give solid Polymers L and M. Table 5 lists the quantities of reagents and Table 6 lists the reaction conditions required for making Polymers L and M.

TABLE 5

| Polymer | PEG Type | PEG (g) | Poloxamer Type | Poloxamer (g) | Water (g) | NaOH (g) | DGE PEG Type | DGE PEG (g) | C16 Br (g) | BHT (g) |
|---|---|---|---|---|---|---|---|---|---|---|
| L | PEG4 | 1,301 | Poloxamer 1B | 50.00 | 1.99 | 54.06 | DGE PEG1 | 27.20 | 146.20 | 0.13 |
| M | PEG4 | 1,250 | Poloxamer 1B | 99.00 | 1.99 | 54.06 | DGE PEG1 | 27.20 | 146.20 | 0.13 |

TABLE 6

| Polymer | TIME1 (min) | TIME2 (min) | TIMEE3 (min) | TIME4 (min) | TIME5 (min) | TEMP1 (° C.) | TEMP2 (° C.) |
|---|---|---|---|---|---|---|---|
| L | 16 | 30 | 32 | 30 | 150 | 86-90 | 119-121 |
| M | 35 | 61 | 5 | 30 | 90 | 83-90 | 119-122 |

Polymer Characterization

Polymers of Examples 1, 2, 3, and 4 were characterized by SEC.

SEC Measurement

SEC was used for measuring polymer molecular weight distributions. Waters HPLC System and Empower™ Chromatography Data System, commercially available from the Waters Corporation (Milford, MA) were used to measure the molecular weights. As used herein with respect to polymers, the terms molecular weight, average molecular weight, mean molecular weight, and apparent molecular weight refer to the arithmetic mean of the molecular weight of individual macromolecules as measured by SEC. The relative molecular weight averages from the SEC were calculated versus poly(ethylene glycol/ethylene oxide) (PEG/PEO) standards with narrow molecular weight distribution.

Apparatus Set-up—All Waters modules in the set-up included:

Waters M515 solvent delivery system

Waters M2707 autosampler

Waters M2414 differential refractive index detector (DRI) for the relative SEC

Column bank(s)—see the details in the "Analysis Conditions" section below

Waters Empower™ 3 software

RI range 1.00 to 1.75 RIU

Measurement range $7\times10^{-7}$ RIU

Drift—$2\times10^{-7}$ RIU

Analysis Conditions for SEC was described as follows:

Mobile Phase—70% Methanol/30% 0.6M Lithium acetate (pH 4.8) (w/w)

Flow Rate—0.5 ml/mi

Columns—1 Shodex KW-804 Protein columns (8 mm×300 mm)+1 Shodex KW-803 Protein columns (8 mm×300 mm) in series (Showa Denko America, Inc., 420 Lexington Avenue, Suite 2335A, New York, NY 10170, USA)

Column Temperature 40° C.

DRI (differential refractive index) Detector Temperature 40° C.

Calibration—PEO/PEG standards with narrow molecular weight distribution (Agilent, Inc. 2850 Centerville Road Wilmington, De. 19808-1610)

Sample Concentration—Typically 1.5 mg/ml (unless otherwise noted)—dissolved directly into mobile phase Injection volume—100 μl Polymer Analytical Data Analytical data for Polymers A, B, C, D, E, F, G, H, I, J, K, L, and M is listed in table 7.

TABLE 7

| Polymer | SEC $M_n$ | SEC $M_w$ | Dispersity Index ($M_w/M_n$) |
|---|---|---|---|
| A | 24,300 | 45,300 | 1.87 |
| B | 20,900 | 36,400 | 1.74 |
| C | 20,400 | 34,500 | 1.64 |
| D | 23,200 | 39,000 | 1.68 |
| E | 22,300 | 37,800 | 1.69 |
| F | 22,100 | 37,100 | 1.68 |
| G | 22,000 | 38,900 | 1.77 |
| H | 23,400 | 39,900 | 1.71 |
| I | 24,400 | 41,100 | 1.69 |
| J | 23,800 | 38,300 | 1.61 |
| K | 23,900 | 38,200 | 1.60 |
| L | 11,000 | 14,500 | 1.31 |
| M | 11,200 | 14,600 | 1.30 |

Polymer Solution Data

Aqueous solutions containing 17.50 or 20.00 wt % of solid polymer were prepared by dissolving the solid polymers A-M in water. Polymer solutions A1, B1, C1, D1, E1, F1, G1, H1, I1, J1, K1, L1, and M1 were neutralized with acetic acid. 0.10% of Vantocil 1B® biocide, commercially available from Lonza Group, and 0.02% of Biosperse CN7539 biocide, commercially available from Solenis, and 0.04% of Sag* 47 foam control agent, commercially available from Momentive Performance Materials, were added to each polymer solution. Methyl beta cyclodextrin (also known as CAVOSOL® W7 M TL), commercially available from Wacker Fine Chemicals, was added as a viscosity suppressant to polymer solutions I1, J1, K1, L1, and M1. Viscosity of polymer solutions having 17.50 or 20.00 wt % of solid polymer was measured using a Brookfield Viscometer with either LV spindle #2 (S62), #3 (S63) or spindle #4 (S64) at 25° C. Table 8 lists the amounts of the ingredients described for the polymer solutions and their Brookfield viscosities.

TABLE 8

| Polymer Solution | Polymer | Active Polymer Solid (Wt %) | Methyl Beta Cyclodextrin (Wt %) | Spindle Code | Viscosity (cP) |
|---|---|---|---|---|---|
| A1 | A | 20.00 | — | — | too thick to measure |
| B1 | B | 17.50 | — | S62 | 132 |
| C1 | C | 20.00 | — | S62 | 180 |
| D1 | D | 20.00 | — | S64 | 4,900 |

TABLE 8-continued

| Polymer Solution | Polymer | Active Polymer Solid (Wt %) | Methyl Beta Cyclodextrin (Wt %) | Spindle Code | Viscosity (cP) |
|---|---|---|---|---|---|
| E1 | E | 20.00 | — | S64 | 10,400 |
| F1 | F | 20.00 | — | S64 | 4,560 |
| G1 | G | 20.00 | — | S64 | 4,360 |
| H1 | H | 20.00 | — | S64 | 5,080 |
| I1 | I | 20.00 | 2.50 | S63 | 1,816 |
| J1 | J | 20.00 | 2.50 | S64 | 3,340 |
| K1 | K | 20.00 | 2.50 | S64 | 4,360 |
| L1 | L | 20.00 | 2.50 | S64 | 7,100 |
| M1 | M | 20.00 | 2.50 | S64 | 12,500 |

Summary of Paint Application Data

Base Paint Preparation

A semi-gloss base paint formulation was prepared by mixing the grind formulation given in Table 9A and letdown formulations given in Table 9B. During the let-down phase, the low shear polymer solution, high shear polymer solution, and water were withheld.

TABLE 9A

| Ingredient | Raw Material | Pounds | Gallons | Density (Pounds/Gallon) |
|---|---|---|---|---|
| 1 | Water | 151.20 | 18.15 | 8.33 |
| 2 | Nuosept 498G | 0.21 | 0.13 | 8.76 |
| 3 | Ammonium Hydroxide (28%) | 1.50 | 0.17 | 8.70 |
| 4 | Tamol 731A | 8.00 | 0.87 | 9.20 |
| 5 | Dextrol OC-180HS | 2.00 | 0.22 | 9.20 |
| 6 | Drewplus T-4304 | 3.00 | 0.38 | 8.00 |
| 7 | Strodex PK-95G | 2.00 | 0.22 | 9.20 |
| 8 | Ti Pure R-706 | 250.00 | 7.51 | 33.30 |
| 9 | Minex 7 | 15.00 | 0.69 | 21.70 |
| 10 | Minugel 400 | 1.75 | 0.06 | 28.00 |

Grind for 15 minutes to achieve a Hegman scale 4-5.

TABLE 9B

| Ingredient | Raw Material | Pounds | Gallons | Density (Pounds/Gallon) |
|---|---|---|---|---|
| 11 | Rhoplex VSR 1050 | 500.00 | 56.56 | 8.84 |
| 12 | Optifilm Enhancer 400 | 8.00 | 0.99 | 8.07 |
| 13 | Drewplus T-4304 | 2.00 | 0.25 | 7.93 |
| 14 | Polyphase 678 | 3.00 | 0.31 | 9.68 |
| (Withheld) | Water | (83.95) | 10.08 | 8.33 |
| (Withheld) | High Shear Polymer Solution | (24.00) | 2.77 | 8.66 |
| (Withheld) | Low Shear Polymer Solution | 5.00 | 0.57 | 8.70 |

Nuosept™ 498G: 1,2-benzisothiazolin-3-one, commercially available from Ashland Inc.

Tamol™ 731A: Sodium salt of a maleic anhydride copolymer, commercially available from The Dow Chemical Company Dextrol OC-180HS: Phosphate ester surfactant from Ashland Inc.

Drewplus™ T-4304: A defoamer, commercially available from Ashland Inc.

Strodex™ PK-95G: Neutralized form of a phosphate coester of aliphatic alcohols, commercially available from Ashland Inc.

Ti-Pure R-706: Titanium dioxide, commercially available from Chemours company

Minex® 7: Micronized functional filler having a median particle size of 3.5 microns, commercially available from The Cary Company.

Min-U-Gel 400: attapulgite mineral from Active Minerals International LLC.

Rhoplex VSR1050: Acrylic latex from Dow Chemicals

Optifilm™ Enhancer 400: a coalescent, commercially available from Eastman Chemical Company.

Polyphase 678: Water-based fungicide from Troy Corporation

Thickening Efficiency Measurement

Thickening efficiency of polymer solution Examples in paint was measured at two dosage levels: 0.09 wt % and 0.54 wt %. Brookfield Viscosity, Stormer viscosity (KU), and ICI viscosity were measured as described below. Brookfield Viscosity was measured using a Brookfield viscometer with spindle #5 at 30 rpm at 25° C. It is expressed in mPa·s. Stormer Viscosity was measured using a Stormer viscometer as per the standard test method ASTM D562 at 25° C. It is expressed in Kreb Units (KU). ICI Viscosity was measured using an ICI cone and plate viscometer as per the standard test method ASTM D4287. It is expressed in mPa·s. Thickening efficiency measurements at 0.09 wt % and 0.54 wt % are provided in Table 10.

TABLE 10

| Polymer Solution | Polymer Solution (Wt %) | Stormer Viscosity (KU) | ICI Viscosity (mPa · s) | Brookfield Viscosity (mPa · s) |
|---|---|---|---|---|
| D1 | 0.09 | 44 | 59.0 | 240 |
| E1 | 0.09 | 51 | 55.6 | 333 |
| F1 | 0.09 | 44 | 51.0 | 200 |
| G1 | 0.09 | 44 | 42.3 | 213 |
| H1 | 0.09 | 45 | 38.3 | 200 |
| I1 | 0.09 | 107 | 36.7 | 4000 |
| J1 | 0.09 | 122 | 43.5 | 11,430 |
| K1 | 0.09 | 122 | 32.9 | 11,640 |
| L1 | 0.09 | 112 | 5.0 | 7,120 |
| M1 | 0.09 | 118 | 4.4 | 8,440 |
| A1 | 0.54 | 117 | 60.6 | 9,227 |
| B1 | 0.54 | 57 | 22.7 | 453 |
| C1 | 0.54 | 52 | 20.0 | 293 |
| D1 | 0.54 | 73 | 118.7 | 907 |
| E1 | 0.54 | 87 | 121.5 | 2,200 |
| F1 | 0.54 | 68 | 108.5 | 707 |
| G1 | 0.54 | 70 | 129.6 | 800 |
| H1 | 0.54 | 70 | 113.7 | 800 |
| I1 | 0.54 | 110 | 106.0 | Too high to measure |
| J1 | 0.54 | 160 | 65.0 | Too high to measure |
| K1 | 0.54 | 165 | 55.0 | Too high to measure |
| L1 | 0.54 | 162 | 25 | Too high to measure |
| M1 | 0.54 | 175 | 21.9 | Too high to measure |

What is claimed is:

1. A hydrophobically-modified associative thickener polymer prepared from a reaction mixture comprising:

a) Poloxamer tri-block copolymer of the formula (I):

(I)

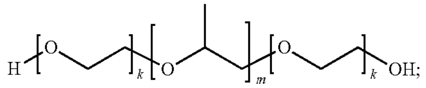

b) at least one active hydrogen-containing compound;

c) a gem-polyhalide with an alkali hydroxide; or d) a polyglycidyl ether with an alkali hydroxide; and e) optionally, a hydrophobe-containing compound wherein k is an integer in a range from 5 to 200 and m is an integer in a range from 5 to 150.

2. A hydrophobically-modified associative thickener polymer of claim 1, wherein k is an integer in a range from 15-150 and wherein m is an integer in a range from 10 to 100.

3. A hydrophobically-modified associative thickener polymer of claim 1, wherein the poloxamer tri-block copolymer is present in amount from about 1 wt % to 99.9 wt % of the mixture.

4. A hydrophobically-modified associative thickener polymer of claim 1, wherein the at least one active hydrogen-containing compound is selected from the group consisting of:

an active hydrogen-containing compound of formula (II):

$$D\text{-}X_n \quad \text{(II)}$$

wherein X is OH, SH, or $NH_2$; D is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, aliphatic, cycloaliphatic, and polycyclic moieties, optionally containing at least one heteroatom; and n is an integer in a range from 1 to 4.

5. A hydrophobically-modified associative thickener polymer of claim 4, where the at least one active hydrogen-containing compound is an alkoxylated or non-alkoxylated alcohol represented by the formula (III):

(III)

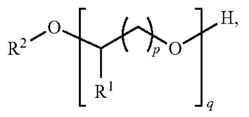

wherein $R^1$ is H or alkyl; p is an integer in a range from 1 to 3; q is an integer in a range from 0 to 500; $R^2$ is a linear, branched, substituted, unsubstituted compound having a functionality selected from the group consisting of alkyl, alkylene, alkenyl, alkylyne, alkynyl, aryl, arylalkylene, arylalkenyl, arylalkynyl, cyclic, and cycloaliphatic compounds, and wherein the total number of carbon atoms is in a range from 1 to 30.

6. A hydrophobically-modified associative thickener polymer of claim 5, where the at least one active hydrogen-containing compound is an alkoxylated or non-alkoxylated alcohol represented by the formula (IV):

(IV)

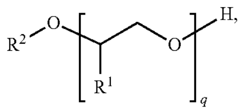

wherein R1 is H or methyl; q is an integer in a range from 0 to 500; R2 is a linear, branched, substituted, unsubstituted compound having a functionality selected from the group consisting of alkyl, alkylene, alkenyl, aryl, and wherein the total number of carbon atoms is in a range from 1 to 30.

7. A hydrophobically-modified associative thickener polymer of claim 6, where the at least one active hydrogen containing-compound is methanol, ethanol, 1-propanol, 1-butanol, 1-pentanol, 1-hexanol, 1-heptanol, 1-octanol, 1-nonanol, 1-decanol, 1-undecanol, 1-dodecanol, 1-tridecanol, 1-tetradecanol, 1-pentadecanol, 1-hexadecanol, 1-heptadecanol, 1-octadecanol, 1-nonadecanol, 1-eicosanol, 1-henicosanol, 1-docosanol, tristyrylphenol, nonylphenol, octylphenol, and ethoxylates derived from the listed alcohols.

8. A hydrophobically-modified associative thickener polymer of claim 1, wherein the at least one active hydrogen-containing compound is represented by formula (V):

(V)

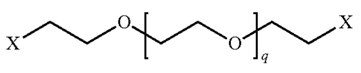

wherein X is OH, SH, or $NH_2$; and q is an integer in a range from 0 to 500.

9. A hydrophobically-modified associative thickener polymer of claim 8, wherein the at least one active hydrogen-containing compound is selected from the group consisting of dihydric alcohol, a polyol, or a polyetheramine.

10. A hydrophobically-modified associative thickener polymer of claim 9, wherein the dihydric alcohol is selected from the group consisting of polyethylene glycol and aminoethylpolyethylene glycol.

11. A hydrophobically-modified associative thickener polymer of claim 9, wherein the polyol is selected from the group consisting of polyether polyols, glycerin initiated ethylene oxide trifunctional polyols, pentaerythritol initiated ethylene oxide tetrafunctional polyols, polyester polyols, and polyaminoethers.

12. A hydrophobically-modified associative thickener polymer of claim 9, wherein the polyetheramine is dihydric polyetheramines.

13. A hydrophobically-modified associative thickener polymer of claim 1, wherein the total of the at least one active hydrogen-containing compound are present in an amount from about 50 wt % to about 99 wt %.

14. A hydrophobically-modified associative thickener polymer of claim 1, wherein the hydrophobe-containing compound is a monofunctional hydrophobe-containing component having a functionality selected from the group consisting of a halide, sulfonate ester, and epoxide.

15. A hydrophobically-modified associative thickener polymer of claim 14, wherein the monofunctional hydrophobe-containing component with an epoxide functionality is represented by the formula (VI):

(VI)

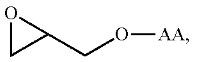

wherein AA is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, cycloaliphatic, and polycyclic moieties, optionally containing at least one heteroatom.

16. A hydrophobically-modified associative thickener polymer of claim 15, wherein the monofunctional hydrophobe-containing component with an epoxide functionality is selected from the group consisting of allylglycidyl ether (AGE), 2-ethylhexylglycidyl ether (EHGE), hexadecylglycidyl ether (HAGE-13), oxirane [(docosyloxy), methyl] (HAGE-22), naphthylglycidyl ether (NGE), n-butylglycidyl ether (n-BGE), iso-butylglycidyl ether (iso-BGE), E10P glycidyl ether, glycidyl ether based on cashew nutshell liquid, and Cardura™ E10P glycidyl ester.

17. A hydrophobically-modified associative thickener polymer of claim 14, wherein the monofunctional hydrophobe-containing component with halide functionality is represented by the formula (VII):

$$Z\text{-}G \quad \text{(VII)}$$

wherein Z is Br, Cl, I, or F; and G is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, cycloaliphatic, and polycyclic moieties, optionally containing at least one heteroatom.

18. A hydrophobically-modified associative thickener polymer of claim 17, wherein the monofunctional hydrophobe-containing component with halide functionality is selected from the group consisting of 1-bromobutane, 1-bromopentane, 1-bromohexane, 1-bromoheptane, 1-bromooctane, 1-bromononane, 1-bromodecane, 1-bromoundecane, 1-bromododecane, 1-bromotridecane, 1-bromotetradecane, 1-bromopentadecane, 1-bromohexadecane, 1-bromoheptadecane, 1-bromooctadecane, 1-bromononadecane, 1-bromoeicosane, 1-bromohenicosane, and 1-bromodocosane.

19. A hydrophobically-modified associative thickener polymer of claim 1, wherein the hydrophobe-containing compound is present in an amount from about 1 wt % to about 25 wt %.

20. A hydrophobically-modified associative thickener polymer of claim 1, wherein the gem-polyhalide is selected from the group consisting of dibromomethane, dichloromethane, 1,1-dichlorotoluene, 1,1-dichloroethane and 1,1-dibromoethane, pentaerythrityl tetrabromide, 1,3-dibromo-2-(bromomethyl)-2-methylpropane, 1,3-dichloro-2-(chloromethyl)-2-methylpropane, 2,2-dimethyl-1,3-dichloropropane, 1,3-dibromo-2,2-dimethylpropane, 1,3-dibromo-2-(bromomethyl)-propane, 1,3,5-tris(chloromethyl)benzene, p-xylylene dibromide, pentaerythritol tetrachloride, 1,3,5-tris(bromomethyl)benzene, 1-(bromomethyl)-4-(chloromethyl)-benzene, 1,3-dichloro-2-(chloromethyl)propane, pentaerythrityl tetrabromide, and 1,3,5-tris(bromomethyl) benzene.

21. A hydrophobically-modified associative thickener polymer of claim 20, wherein the gem-polyhalide is present in amount from about 0.1 wt % to about 10.0 wt %.

22. A hydrophobically-modified associative thickener polymer of claim 1, wherein the polyglycidyl ether is represented by formula (VIII):

(VIII)

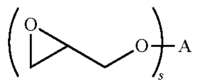

where A is a substituted or unsubstituted compound having a functionality selected from the group consisting of alkyl, alkylene, alkyne, alkenyl, alkynyl, aryl, alkylaryl, arylalkylene, arylalkyne, arylalkenyl, arylalkynyl, cyclic, cycloaliphatic, and polycyclic moieties, optionally containing at least one heteroatom; and s is an integer in the range from 2 to 4.

23. A hydrophobically-modified associative thickener polymer of claim 22, wherein the polyglycidyl ether is represented by formula (IX):

(IX)

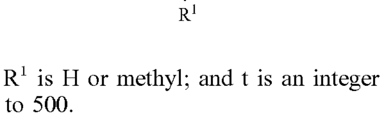

Where $R^1$ is H or methyl; and t is an integer in the range from 1 to 500.

24. A hydrophobically-modified associative thickener polymer of claim 1, wherein the alkali hydroxide is selected from the group consisting of sodium hydroxide, potassium hydroxide, and a combination thereof.

25. A hydrophobically-modified associative thickener polymer of claim 1, wherein the alkali hydroxide is present in an amount from about 1.0 wt % to 10.0 wt %.

26. An aqueous protective coating composition comprising a hydrophobically-modified associative thickener polymer of claim 1.

27. The aqueous protective coating composition of claim 26, further comprising a substantially water insoluble polymer such as a latex polymer or polymer dispersion.

28. The aqueous protective coating composition of claim 27, wherein the substantially water insoluble polymer is selected from the group consisting of, but not limited to, vinyl acetate ethylenes, acrylics, vinyl-acrylics, styrene-acrylics, styrene-butadiene copolymers, butadiene-acrylonitrile copolymers, epoxides, urethanes, polyamides, vinyl esters of versatic acid (VeoVa) and polyesters.

29. The aqueous protective coating composition of claim 26, further comprising a pigment/extender.

30. The aqueous protective coating composition of claim 29, wherein the pigment/extender is selected from the group consisting of, but not limited to, organic and inorganic materials such as phthalocyanines, iron oxides, titanium dioxides, zinc oxide, indigo, hydrated aluminum oxide, barium sulfate, calcium silicate, clay, silica, talc, and mixtures thereof.

31. The aqueous protective coating composition of claim 26, further comprising one or more from a group comprising of a coalescent, a solvent/cosolvents, a wetting agent, a defoamer, a matting agent, a dispersant, a biocide, a mildewcide, secondary rheology modifiers, thixotropic agents, crosslinkers, pH adjustment agents, flow-control agents, gloss-control agents, flexibilizing resins, surfactants, waxes, wetting agents, dispersing agents, plasticizers, anti-oxidants, UV radiation absorbers, biocides, colorants, adhesion promoters, defoamers, film-forming agents, matting agents, and combinations thereof.

32. The aqueous protecting coating composition of claim 26, comprising from about 0.05 wt % to about 10 wt % of a hydrophobically-modified associative thickener polymer of claim 1.

33. The aqueous protecting coating composition of claim 32, comprising from about 0.5 wt % to about 7 wt % of a hydrophobically-modified associative thickener polymer of claim 1.

34. The aqueous protective coating composition of claim 26, wherein the aqueous protective composition is an architectural or industrial paint.

35. A process to prepare a hydrophobically-modified associative thickener polymer of claim 1, comprising:

i) a reactor is charged with poloxamer tri-block copolymer, at least one active hydrogen-containing compound, and an alkali hydroxide while heating the contents of the reactor to at least 70° C.,
ii) the contents of the reactor are mixed under vacuum of around 29 inches Hg,
iii) a gem-polyhalide is added to the reaction mixture of step ii) and the contents of the reactor are mixed,
iv) optionally, the temperature of the reaction mixture is increased,
v) optionally, a hydrophobe-containing compound is added, and the contents of the reactor are further mixed,
vi) the contents of the reactor are discharged and allowed to cool to 20-25° C. to obtain a solid polymer.

36. A process to prepare a hydrophobically-modified associative thickener polymer of claim 1, comprising:

i) a reactor is charged with poloxamer tri-block copolymer, at least one active hydrogen-containing compound, and an alkali hydroxide while heating the contents of the reactor to at least 70° C., ii) the contents of the reactor are mixed under vacuum of around 29 inches Hg, iii) a polyglycidyl ether is added to the reaction mixture of step ii) and the contents of the reactor are mixed, iv) optionally, the temperature of the reaction mixture is increased, v) optionally, a hydrophobe-containing compound is added, and the contents of the reactor are further mixed, vi) the contents of the reactor are discharged and allowed to cool to 20-25° C. to obtain a solid polymer.

* * * * *